United States Patent
Nguyen et al.

(10) Patent No.: US 8,936,838 B2
(45) Date of Patent: Jan. 20, 2015

(54) METHOD FOR COATING POLYMERS ON GLASS EDGES

(71) Applicant: Corning Incorporated, Corning, NY (US)

(72) Inventors: Kelvin Nguyen, Macedon, NY (US); Paul John Shustack, Elmira, NY (US)

(73) Assignee: Corning Incorporated, Corning, NY (US)

( * ) Notice: Subject to any disclaimer, the term of this patent is extended or adjusted under 35 U.S.C. 154(b) by 50 days.

(21) Appl. No.: 13/737,412

(22) Filed: Jan. 9, 2013

(65) Prior Publication Data

US 2013/0183454 A1 Jul. 18, 2013

Related U.S. Application Data

(60) Provisional application No. 61/586,889, filed on Jan. 16, 2012.

(51) Int. Cl.
*C03C 17/00* (2006.01)
*B05C 17/00* (2006.01)

(52) U.S. Cl.
CPC ............. *C03C 17/001* (2013.01); *C03C 17/007* (2013.01); *B05C 17/00* (2013.01); *C03C 2217/445* (2013.01); *C03C 2217/475* (2013.01)
USPC .......................................... 427/508; 427/429

(58) Field of Classification Search
CPC ................. C03C 17/001; C03C 17/007; C03C 2217/445; C03C 2217/475; C09D 7/1266; B05C 17/00; B05D 3/067; C08F 2/48
USPC .................................................. 427/429, 508
See application file for complete search history.

(56) References Cited

U.S. PATENT DOCUMENTS

2001/0051230 A1 12/2001 Colton et al.
2008/0199618 A1 8/2008 Wen et al.
(Continued)

FOREIGN PATENT DOCUMENTS

CN   101638299   2/2010
EP   0435534     7/1991
(Continued)

OTHER PUBLICATIONS

Machine translation of CN101638299 (Feb. 3, 2010).
(Continued)

*Primary Examiner* — Elena T Lightfoot
(74) *Attorney, Agent, or Firm* — John T. Haran

(57) ABSTRACT

The present disclosure is directed to a method for coating the edge of glass articles. The shaped edge of a glass article is inserted into the slot of a coating apparatus. The coating apparatus includes a vessel containing a UV curable coating material, an element connected to the vessel having the slot, wherein the slot is shaped to receive an edge of the glass article; and a coating pad having a coating surface shaped to conform to the shaped edge of the glass article, the pad having a network of interconnected openings therethrough, wherein the coating pad extends from the vessel and into the element so that the coating surface forms a bottom surface of the slot. An ultraviolet (UV) curable coating material is supplied to the coating pad and the shaped edge is contacted with the coating pad surface to transfer a selected thickness of the coating material from the coating pad to the shaped edge. The UV curable coating material is then cured on the shaped glass edge.

13 Claims, 6 Drawing Sheets

(56) References Cited

U.S. PATENT DOCUMENTS

| | | | |
|---|---|---|---|
| 2009/0207374 A1 | 8/2009 | Ho et al. | |
| 2010/0221501 A1 | 9/2010 | Chen et al. | |
| 2010/0244286 A1* | 9/2010 | Lagsa | 257/789 |
| 2010/0282260 A1 | 11/2010 | Sung | |
| 2010/0285277 A1 | 11/2010 | Edwards et al. | |

FOREIGN PATENT DOCUMENTS

| | | |
|---|---|---|
| JP | 2011-148948 | 8/2011 |
| WO | 99/46212 | 9/1999 |
| WO | 2005/000762 | 1/2005 |

OTHER PUBLICATIONS

Machine translation of JP2011-148948 (Aug. 4, 2011).
Bongiovanni et al; "UV Cured Coatings Based on Epoxy Resins Containing Nanosilica"; European Coatings, 19/2006, pp. 5-9.
Deflorian et al; "Study of the Effect of Organically Functionalized Silica Nanoparticles on the Properties of UV Curable Acrylic Coatings"; 30$^{th}$ Fatipec Congress 2010, vol. 2 of 2, Genoa, Italy Nov. 19-11, 2010.
Deflorian et al "Study of the Effect of Organically Funtionalized Silica Nanparticles on the Properties of UV Curable Acrylic Coatings"; Progress of Organic Coatings, 72 (2011) 44-51.
Kim; "Characterization of UV Curable Hybrid Hard Coatings Materials Prepared by Sol-Gel Method"; Korean J. Chem. Eng. 28(1), 298-303 (2011).
Roscher; "Improved Properties of Radiation Curing Coatings Containing Colloidal Nanosilica"; Fatipec Conference (2004), 27$^{th}$ (vol. 2), 727-731.
Roscher et al; "Novel Radiation Curable Nanocomposites With Outstanding Material Properties"; Radtech 2002 Conference Proceedings, 321-329.
Sangermano et al; "Nanostructured Coatings Obtained via Cationic UV-Curing"; Mater. Res. Soc. Symp. Proc. vol. 1005, 2007 Materials Research Society.
Sangermano et al; "Photopolymerization of Epoxy Coatings Containing Silica Nanoparticles"; Progress in Organic Coatings 54 (2005) 134-138.
Sangermano et al; "Preparation and Characterization of Hybrid Organic-Inorganic Nanostructured UV-Cured Coatings"; Radtech Europe 2007 Conference Proceedings.
Solinov et al; "Protective Coating for Edges of Glass Matrices"; Glass and Ceramics, vol. 52 Nos. 9-10, 1995 pp. 12-14.
Vu et al; "Abrasion and Scratch Resistant UV-Cured Clearcoats Using Colloidal Silica Acrylates"; Radtech 2000, Technical Proceedings, 822-831.
Vu et al; "Colloidal Silica Acrylates Use in UV Coating"; European Coatings Journal, (2002) (1-2), 64, 66-68, 70.
Vu et al; "Scratch and Abrasion Resistant UV-Topcoats for Plastics Using Colloidal Silica Acrylates-Impact of Size, Size Distribution and Silica Loading on Coating Properties"; Society of Plastic Engineers Annual Technical Conference 2002, 60$^{th}$ (vol. 2) 1540-1547.
Wen et al; "Edge-Strengthening of Flat Glass With Acrylate Coatings"; Journal of Non-Crystalline Solids; 354 (2008) 5060-5067.
Wojcik et al; "Hybrid Glass as Protective Coating for Aerospave Optical Fibers and Cables: Validation Test Results"; Mol. Cryst. Liq. Cryst. Bol. 521: pp. 120-125, 2010.
Wojcik et al; "Hybrid Glass Coatings for Optical Fibers. Preliminary Results of Coating Performance on Silica Fibers."; Proc. of SPIE, vol. 5951 (2005), 595108-1-595108-8.
Zhang et al; "Wear-Resistant and Transparent Acrylate-Based Coating With Highly Filled Nanosilica Particles"; Tribology International 43 (2010) 83-91.

* cited by examiner

METHOD FOR COATING POLYMERS ON GLASS EDGES

This application claims the benefit of priority under 35 U.S.C. §119 of U.S. Provisional Application Ser. No. 61/586,889 filed on Jan. 16, 2012 the content of which is relied upon and incorporated herein by reference in its entirety.

FIELD

This disclosure is directed to a method for coating polymers on edge surfaces, and in particular for coating polymers on glass edges. The disclosure is also directed to an apparatus that can be used in the method for coating the polymers on the glass edges.

BACKGROUND

Glass is known to be extremely strong in the freshly manufactured stated; for example, by drawing (fusion draw or slot draw), the float process and other methods. However, the strength rapidly deteriorates as the surface becomes flawed. The flaws can be generated when glass contacts other surfaces and becomes scratched, abraded or impacted and chipped. Damaging contact with other surfaces can be avoided if the glass' surfaces, faces and/or edges, are covered with a protective material; for example, adhesive plastic or paper materials, and polymer films. However, these methods are labor intensive, frequently require covering surfaces that for which protection is either not need or is not desired. In addition, the smaller and/or thinner the glass article, the more difficult it is to protect some of the glass' surfaces, particularly edge surfaces. Further, since many glass articles are cut from large sheets of glass, edge protection is of high importance, particularly for small to medium electronic devices such as cell phones, e-book readers, electronic notepads, notebook and laptop computers, and similar devices.

Several techniques have been tried to strengthen the edge of the glass. One approach has been to acid etch the glass edges to gain strength. Other methods have been described in US Patent Application Publications 2010-0282260, 2010-285277 and 2010-0221501 which include protecting the glass edge using polymer overmolding, a machinable metal armor layer laid over the edge, polymer tapes and liquid polymers, or a shaped fiber such as a glass fiber. However, each has proven unsatisfactory for varying reasons such as they were labor intensive, were not susceptible to automation, required additional processing steps which increased costs, or the edge protection material had to be molded over the edge onto the face of the article which can be undesirable from aesthetic and tactile viewpoints.

Despite all the efforts put forth, there still exists a need for a method of coating multiple glass edges, including profiled edges, for example edges around a glass article that are flat, bull nosed, chamfered or have other shapes. The flexibility of being able to coat edges having different shapes is extremely important and desirable, particularly when it comes to various device shapes and sizes, and in some cases there is no bezel frame around the display (that is, a only glass-to-glass display). Further, it is desirable that the method of applying the protective coating not only provides for uniformity and damage resistance, but the coating itself should be either optically clear or substantially transmissive to light wavelengths in one or more of the infrared ("IR"), visible, and ultraviolet ("UV") wavelength ranges. Further, it is desirable is some application that the coating to be non-apparent; that is, the glass should appear to the user of the articles as if it is not coated at all.

The present disclosure is directed to a method of coating edges, particularly shaped edges; a device that can apply a coating to the edges and additionally has an interchangeable element so that it can be used to apply a coating to edges having different shapes; and to particular coating that can be used to coat the edges to provide a protected edge in which the coating

SUMMARY

The present disclosure is directed to a method of coating edges of glass articles, particularly articles with shaped edges; a device that can apply a coating to the shaped edges and additionally has an interchangeable element so that it can be used to apply a coating to edges having different shapes. The coating can be applied in a wrap-around manner to all edges of a glass article. The method can apply coatings to glass articles with different edge profiles; for example, articles whose edge profiles are flat, curved, bull nosed, chamfered and other profiles. After the coating has been applied it is cures either thermally, using actinic radiation or an electron beam. The coating then serves to protect the glass edges from damage by abrasion and/or impact. In one embodiment the coating compositions are based on urethane (meth)acrylate oligomer(s) or epoxy resins that contain nano-size inorganic particles, for example, silica nanoparticles. In one embodiment the inorganic nano-particles in the coating material have a size in the range of 1 nm to 100 nm. In another embodiment the inorganic nano-particles in the coating material have a size in the range of 5 nm to 50 nm. In a further embodiment the inorganic nano-particle in the coating material have a size in the range of 10 nm to 40 nm. The inorganic nano-particle can be selected from the group consisting of silica, carbon and the oxides of iron, aluminum, titanium, tin, zirconium, indium, antimony and cerium. The coating compositions can be formulated to cure either optically clear or substantially transmissive to light wavelengths in one or more of the infrared ("IR"), visible, and ultraviolet ("UV") wavelength ranges. Further, it is desirable in some application that the coating to be non-apparent; that is, the glass should appear to the article's user as if no coating has been applied.

DETAILED DESCRIPTION

This disclosure is directed to a method, called herein the "wrap-around" method, of applying polymers to the edge(s) of glass articles having shaped edges. The term "wrap-around" refers to the pad that is used to coat a glass article's shaped edge. The reason the term "wrap-around" is used is because using a robotic device, or hand held, is possible to rotate the article or the applicator so that all edges are coated without removing the article from the coater. The pad has a shaped surface that conforms to the shape of the glass edge such that when the glass article's edge passes over and in contact with the pad only the edge is coated and the coating material does coat or overflow onto the main surfaces of the glass. That is, the coating material does not overflow onto the articles faces defined by the length and width of the article. Also herein, with reference to mineral 18, the terms "groove" and "slot" may be used interchangeably.

Figure 6A:
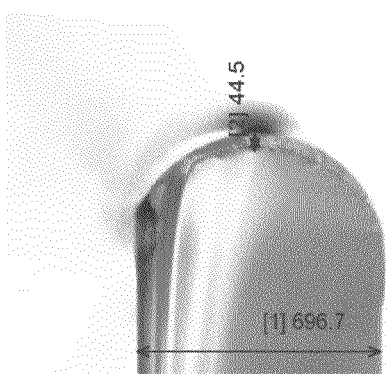
FIGS. 6a and 6b show a bull nosed glass article having a single layer of a UV cured polymer coating and a four layer, UV cured polymer coating in which the polymer was cured after each layer was applied.
Figure 6B:
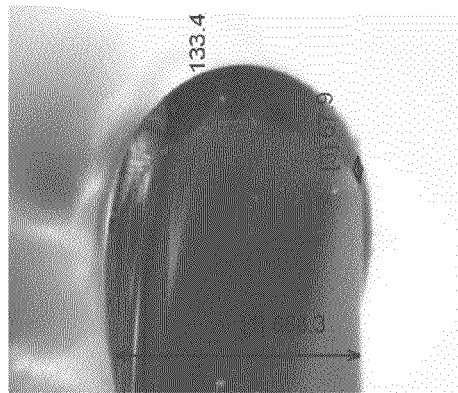
Figure 7A:
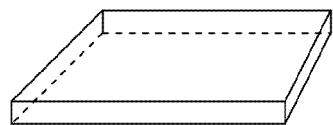
FIGS. 7a and 7b illustrate a 2D glass article and a 3D glass article, respectively.
Figure 7B:
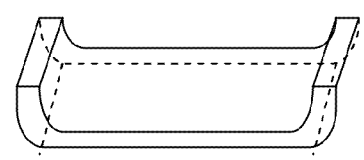

The glass articles have a selected length, selected width and selected thickness which define a first face, a second face and one or a plurality of edges. Circular and oval articles are deemed to have a single edge. Rectangular, square, hexagonal, octagonal, and other shapes having angled corners are deemed to have a plurality of edges defined by the faces and thickness of the glass. In addition the glass articles can be either (1) flat or planar as shown in FIG. 6a, which is sometimes referred to as a two dimensional or 2D article, or (2) three dimensional or 3D article in which the glass article is non-planar as is illustrated in FIG. 6b. The 3D shapes can be made from 2D glass pieces a molding process such as sagging, pressing molding, a combination of pressing and sagging, or can be formed by pressing molding a gob of molten glass.

The edge of a formed glass article can be coated with a polymeric material that can be cured. While either thermal and UV curable polymers can be used in the coating method described herein, it is preferred to use UV curable polymers because they can be cured immediately after the edge has been coated without having to move the article to a furnace or other heat source for curing. For example, the UV curing device can be located adjacent to the coating apparatus.

Figure 1:
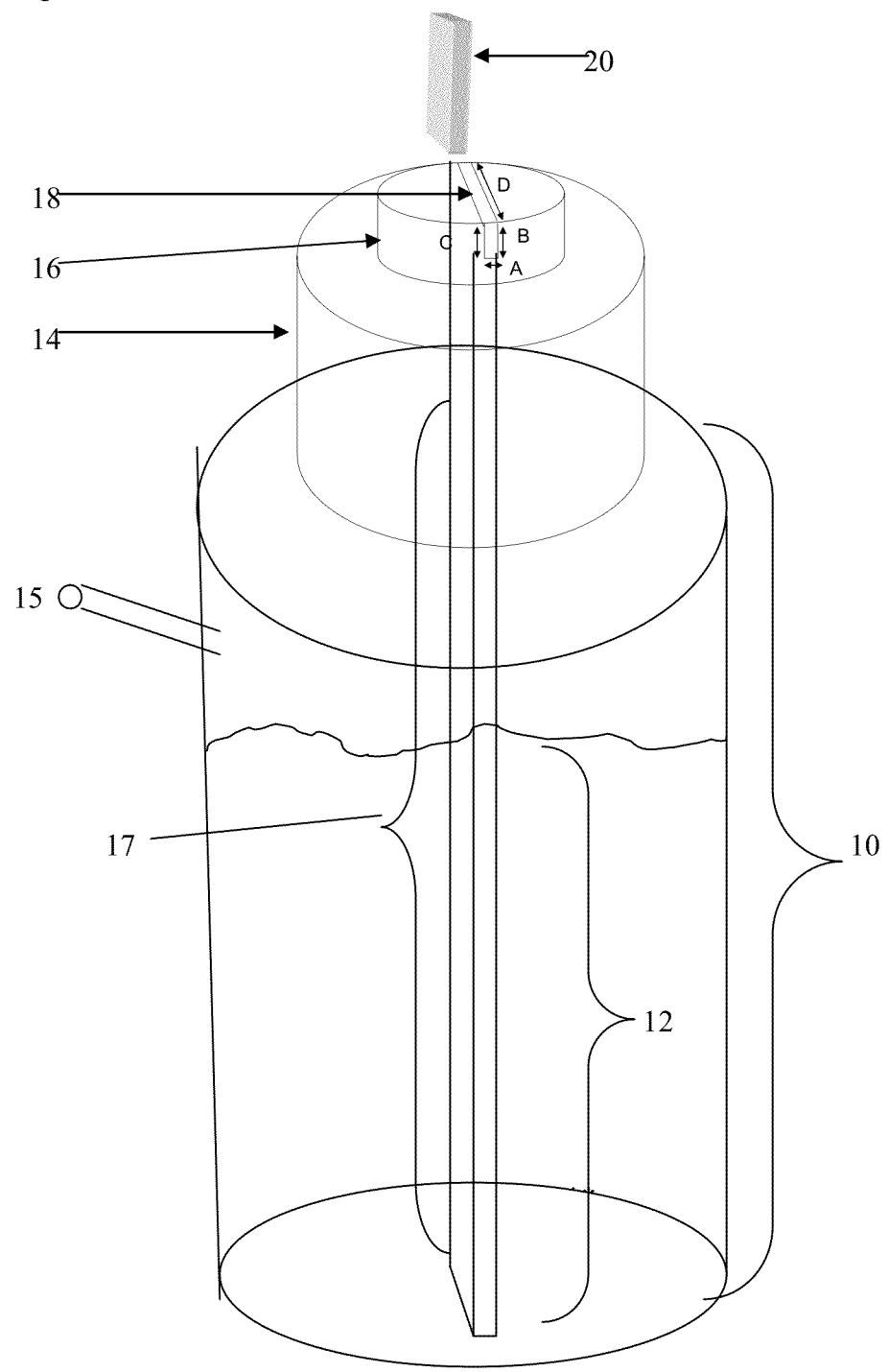
FIG. 1 is an illustration of an embodiment of a coating apparatus illustrating a first or top element having a slot or groove in which is located a coating pad, a vessel containing the coating fluid-polymer, an second element or cap for connecting the top element to the vessel; and the coating pad in the slot can extend from the slot into the fluid in the vessel.

FIG. 1 is an illustration of an exemplary coater that can be used to coat glass edges. The device shown in FIG. 1 consists of a vessel 10 containing a fluid-polymer material 12, an element 16 that has a slot 18, and an element 14 that connect element 16 with vessel 10. The coater also has a coating pad 17 for coating the edge of a glass article with the fluid-polymer material. In one embodiment as exemplified in FIG. 1 the coating pad 17 extends from slot 18 into vessel 10 and is used for moving the fluid-polymer material from the vessel to the slot where it is coated onto the edge of article 20. Tube 15 on the side of vessel 10 is used to maintain the pressure in vessel 10 at either atmospheric pressure or slightly above atmospheric pressure by using pressure equipment (not illustrated) in order to assure that the fluid-polymer continuously feed up pad 17 to slot 18 where the pad 17 will contact the glass article being coated. If the vessel is pressurized, then sensors can be used at both ends of slot 18 so that pressure is maintained only while a glass article is being fed through the slot.

Figure 2A:
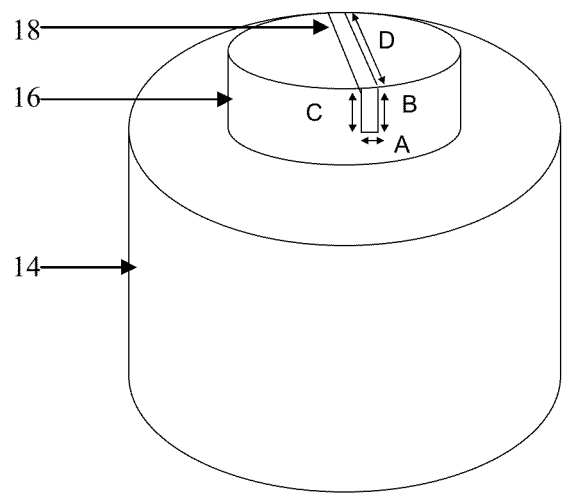
FIG. 2a is an illustration of the interchangeable top element and cap used in the coating method disclosed herein.
Figure 2B:
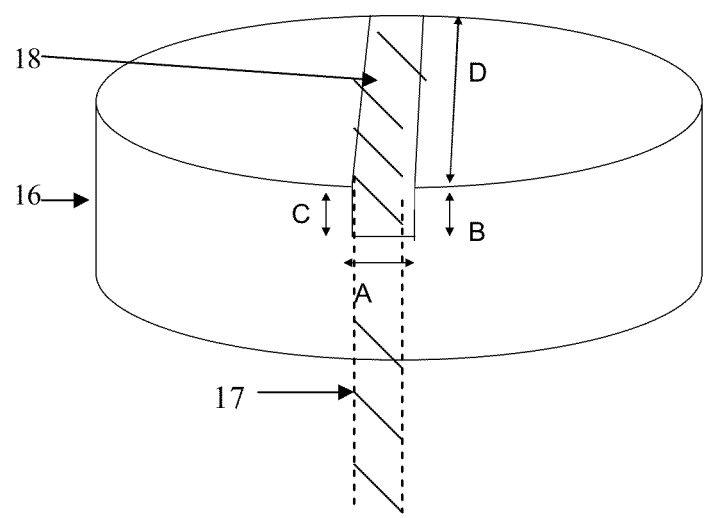
FIG. 2b is an enlargement of top element with its slot and coating pads.
Figure 2C:
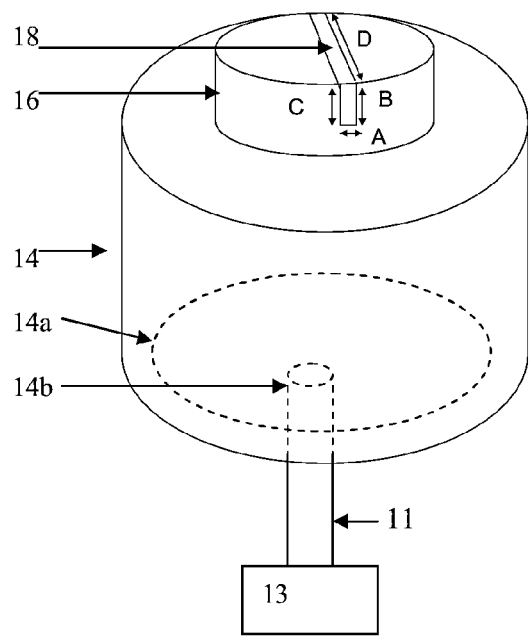
FIG. 2c is an alternate embodiment in which the second element has a base has an opening in it than can be connected to a pump.

FIG. 2a provides an enlarged view of both elements 14 and 16. FIG. 2b provides an enlarged view of the element 16, slot 18 and pad 17 that, as illustrated in FIG. 1, extends from slot 18 into the fluid-polymer contained in vessel 10. FIG. 2c illustrates an embodiment of the disclosure in which element 14 has a base 14a with an opening 14b that is connected to a pump 13 by a tube 11. The pump 13 can be a syringe pump, a peristaltic pump or other type pump suitable for pumping the fluid-polymer material, and tube 11 can be a rigid tube or a flexible tube. When the pump is activated it will pump the fluid-polymer material into element 14 element 16 and to pad 17, which lies within which will absorb it and transfer it to the edge of the glass article as it passes through the slot. The use of a pump type device enables the use of a shorter length coating pad 17 which facilitates changing either the entire assembly of elements 14 and 14, or simple changing element 16, and also enables the use of a shorter pad 17. In FIG. 2c, element 14 acts as the vessel for the fluid-polymer coating material which is pumped through pump 13 and tube 11 into element 14 until the fluid-polymer reached pad 17. Reversing the pump will cause the polymer containing fluid level to retract within element 14 and thus facilitates changing element 16 either because the pad 17 becomes worn or clogged, or because a different shaped pad is required due to a change in the edge shape that will be coated.

Figure 2D:
FIGS. 2d-2f are illustrations of chamfered, bull nosed and flat edged glass articles 20, respectively, and the shaped of the corresponding coating pads 17.
Figure 2D:
Figure 2E:
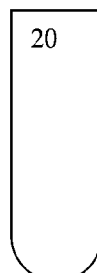
Figure 2E:
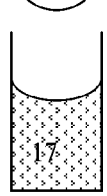
Figure 2F:
Figure 2F:
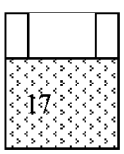
Figure 2G:
FIG. 2g is an illustration of a glass article having an unsymmetrical edge profile and a corresponding shaped coating pad.
Figure 2G:
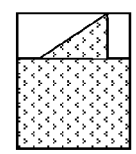

The dimensions A,B,C, and D in FIGS. 1, 2a and 2b can be modified to accompany different edge profiles and shapes. Dimension A represents the width of the slot, B and C represent the represent the depth of the slot, and D represents the length of the slot. These dimensions A,B,C, and D can be modified to accompany different edge profiles and shapes. For example, Dimension A can be changed according to the thickness of the glass article, for example without limitation, 0.1 mm, 1.1 mm, 3 mm, etc. Dimensions B and C according to whether the shaped edge of the glass is symmetrical or non-symmetrical. FIGS. 2d-2f represent symmetrically glass edges where the shapes are chamfered, bull nosed and flat, respectively; and FIG. 2g represents an unsymmetrical glass edge. Dimension D can be changed according to the length of the glass article.

When coating using the a device described herein, the glass edge is either (a) placed into the coating slot and the fluid polymer material is forced through the pad to coat the edge groove for coating, or (b) coated by swiping from one end of the slot to the other end after the fluid polymer fluid polymer material has been forced through the pad in the slot. The pad is made of a material that will soak up the fluid polymer material and the pad also has a network of interconnected openings that are sufficiently larger so that the nanoparticles in the fluid polymer material can pass through the pad. In order to allow the nanoparticles in the coating material to pass through the interconnected openings in the pad. The opening should have a diameter in the range of 0.01 µm to 1000 µm. The pad material is typically a dispensing "felt" material, for example, dispensing "felt" pads made by Designetics, Inc (Holland, Ohio). Similar materials can be obtained from other corporations. Although the shapes of the felt materials have not been designed for the use described herein, they can be modified to have a shape that is complimentary to the shape of the glass edge as is illustrated in FIGS. 2d-2g. It is critical that all the dimensions A,B,C,D be controlled during the design and making of the coating pad and the slot in order to insure that that a good coating is applied to the glass edge. Dimensions B and C control the coating depth on each side of the glass article, and this for unsymmetrical articles the dimensions are different to insure that the edge has a uniform coating thickness on all its surfaces. The thickness of the glass article that can be coated is controlled by dimension A and control of this dimension is necessary in order to avoid wobble as the glass is passed through the slot. The length of the slot is controlled by dimension D, the length typically being at least 40% of the longest edge being coated when the swiping procedure (b) described above is used for coating. If swiping is not used, then the slot should be sufficiently long to accommodate the entire edge being coated. Using the method and devices described herein, the thickness of the applied coating material per swipe is in the range of 15 μm to 50 μm. The minimum coating thickness needed to provide edge protection is approximately 15 μm. The applied coating thickness depend on the viscosity and how we control the geometry of the slot.

Figure 3:
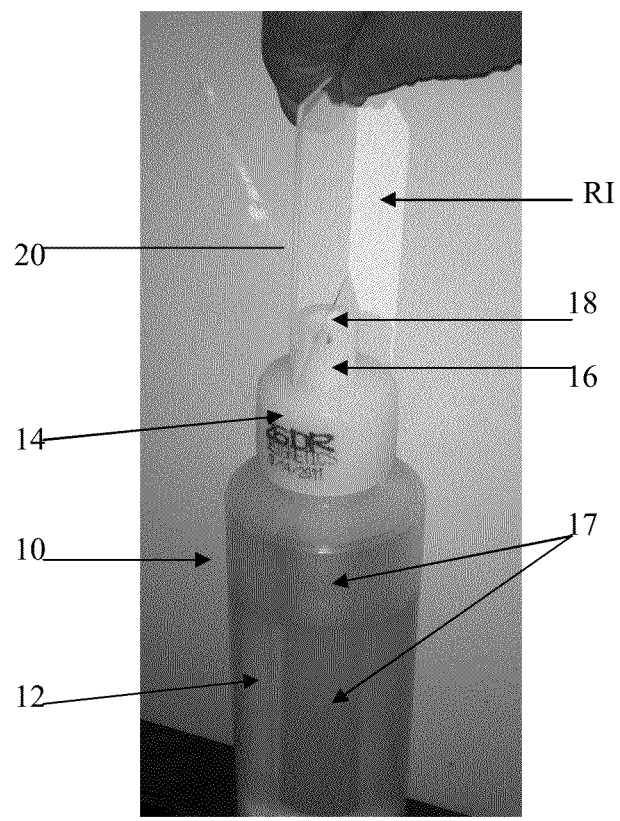
FIG. 3 is photograph showing a laboratory coater in which vessel 10 is a soft plastic material that can be squeezed.
Figure 4A:
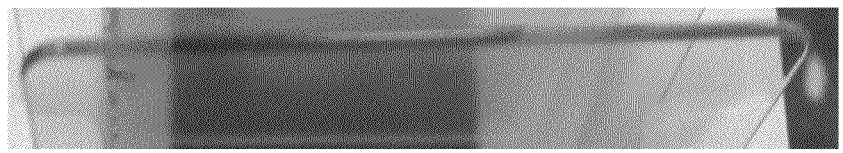
FIG. 4a shows a 0.7 mm thick glass article having UV cured polymer coating on a bull nosed shaped edge.
Figure 4B:
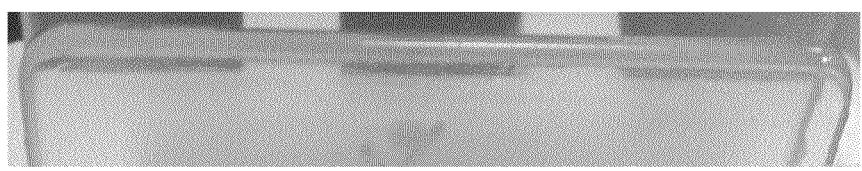
FIG. 4b shows a 1.1 mm thick glass article having UV cured polymer coating on a bull nosed shaped edge.

FIG. 3 is photograph showing a laboratory coater that uses a vessel 10 than can be squeezed. The coater vessel 10 contains fluid UV curable epoxy material which is the epoxy described in Table 1. A washed glass article having beveled edges is hand held. The numerals have the same meaning as those of FIG. 1, and, to avoid any confusion, "RI" indicates the reflected image of article 20 on the wall behind the coater. When the user is ready to coat, the bottle was gently squeezed to push the material upward and wet the pad, which was made of felt, and then the squeezing pressure was released. The amount of pressure that was used to push the material upward to wet the felt pad is dependent on the viscosity of the coating material. The felt pad soaked up the coating and retained a certain amount for coating when the pressure was released. The edges of the washed, beveled, ion-exchanged glass article were swiped then through the slot and were in contact with the pad to coat the edge(s) with the polymer material. The groove depth (dimensions B and C) determine the amount of coating material that was placed on the glass edges. The dimensions B and C can be separately controlled for a non-symmetric edge profile so that coating can be coated evenly around the entire part. FIGS. 4a and 4b are examples of coating glass for both symmetric and non-symmetric profiles.

The coating devices described herein can be used for laboratory, pilot line or production coating of parts. For pilot line or production uses, the tip can have multiple grooves to coat multiple pieces as the time. In one embodiment the edges of the glass articles or parts are coated one edge side at a time. For example, for a rectangular part with four edges, the first edge is coated by passing the part through the coating tip; the part is rotated and the second edge is passed through the coating tip, and so on until all four edges have been coated. When UV curable polymer materials are used, the edges can be UV cured after all edges have been coated. Alternatively, by positioning a UV curing device near the exit of the slot, each edge can be separately cured after it is coated. The edges are coated and cured in sequence. When curing is done after all edges have been coated the glass article can be held by a vacuum chuck and either (a) the coating tip moves and coats each edge of the article, or (b) the vacuum chuck can is rotated and is used to rotate the glass article after each edge has been coated until all sides have been completed.

The coating compositions are based on urethane (meth) acrylate oligomer(s) or epoxy resins that contain nano-size inorganic particles, for example, silica nanoparticles. The coating compositions can be formulated to cure either optically clear or substantially transmissive to light wavelengths in one or more of the infrared ("IR"), visible, and ultraviolet ("UV") wavelength ranges. In one embodiment the coating compositions are UV curable compositions. Table 1 describes a representative UV curable epoxy coating and Table 2 describes a representative UV curable urethane (meth)acrylate oligomeric coating composition. Using the method and device(s) described herein, the coating materials can have a viscosity in the range of 300 cps to 10000 cps.

TABLE 1

| Percent by weight | Material Trade Name | Material Chemical Type |
|---|---|---|
| 48.00 | Nanopox C-620 | Cycloaliphatic epoxy resin containing 40 wt % 20 nm spherical silica nanoparticles |
| 48.00 | Nanopox C-660 | Oxetane monomer containing 50 wt % 20 nm spherical silica nanoparticles |
| 1.00 | Cyacure UVI-697 E | Cationic photoinitiator |
| 2.00 | Silquest A-186 | Silane adhesion promoter |

The epoxy-based UV curable material can either be clear or colored, and has a viscosity in the range of 300 cps to 10000 cps.

TABLE 2

| Percent by weight | Material Trade Name | Material Chemical Type |
|---|---|---|
| 44.00 | CN9009 | Aliphatic urethane acrylate oligomer |
| 50.00 | 16046-27-1 | Acrylic monomer containing 30 wt % 20 nm spherical silica nanoparticles |
| 3.00 | Irgacure 184 | Photoinitiator |
| 3.00 | APTMS | Silane adhesion promoter |

The urethane-based UV curable material can either be clear or colored, and has a viscosity in the range of 300 cps to 10000 cps.

Table 3 describes the composition of a representative of the non-ion-exchanged glass article that can be coated using the method and devices described herein. These composition can be ion-exchanged using, for example, a $KNO_3$ salt bath to replace sodium and/or lithium ions in the glass with potassium.

TABLE 3

| Non-ion-exchanged glass compositions | | | | | | | | | | | |
|---|---|---|---|---|---|---|---|---|---|---|---|
| Oxides | Glass | | | | | | | | | | |
| (mol %) | 1 | 2 | 3 | 4 | 5 | 6 | 7 | 8 | 9 | 10 | 11 |
| $SiO_2$ | 66.16 | 69.49 | 63.06 | 64.89 | 63.28 | 67.64 | 66.58 | 64.49 | 66.53 | 67.19 | 70.62 |
| $Al_2O_3$ | 10.29 | 8.45 | 8.45 | 5.79 | 7.93 | 10.63 | 11.03 | 8.72 | 8.68 | 3.29 | 0.86 |

TABLE 3-continued

Non-ion-exchanged glass compositions

| Oxides (mol %) | Glass | | | | | | | | | | |
|---|---|---|---|---|---|---|---|---|---|---|---|
| | 1 | 2 | 3 | 4 | 5 | 6 | 7 | 8 | 9 | 10 | 11 |
| $TiO_2$ | 0 | — | — | — | — | 0.64 | 0.66 | 0.056 | 0.004 | — | 0.089 |
| $Na_2O$ | 14 | 14.01 | 15.39 | 11.48 | 15.51 | 12.29 | 13.28 | 15.63 | 10.76 | 13.84 | 13.22 |
| $K_2O$ | 2.45 | 1.16 | 3.44 | 4.09 | 3.46 | 2.66 | 2.5 | 3.32 | 0.007 | 1.21 | 0.013 |
| $B_2O_3$ | 0.6 | — | 1.93 | — | 1.9 | — | — | 0.82 | — | 2.57 | — |
| $SnO_2$ | 0.21 | 0.185 | — | — | 0.127 | — | — | 0.028 | — | — | — |
| BaO | 0 | — | — | — | — | — | — | 0.021 | 0.01 | 0.009 | — |
| $As_2O_3$ | 0 | — | — | — | — | 0.24 | 0.27 | — | — | 0.02 | — |
| $Sb_2O_3$ | — | — | 0.07 | — | 0.015 | — | 0.038 | 0.127 | 0.08 | 0.04 | 0.013 |
| CaO | 0.58 | 0.507 | 2.41 | 0.29 | 2.48 | 0.094 | 0.07 | 2.31 | 0.05 | 7.05 | 7.74 |
| MgO | 5.7 | 6.2 | 3.2 | 11.01 | 3.2 | 5.8 | 5.56 | 2.63 | 0.014 | 4.73 | 7.43 |
| $ZrO_2$ | 0.0105 | 0.01 | 2.05 | 2.4 | 2.09 | — | — | 1.82 | 2.54 | 0.03 | 0.014 |
| $Li_2O$ | 0 | — | — | — | — | — | — | — | 11.32 | — | — |
| $Fe_2O_3$ | 0.0081 | 0.008 | 0.0083 | 0.008 | 0.0083 | 0.0099 | 0.0082 | 0.0062 | 0.0035 | 0.0042 | 0.0048 |
| SrO | — | — | — | 0.029 | — | — | — | — | — | — | — |

Pictures shown in FIGS. 4a, 4b, 5a, 5b, 6a and 6b represent selected from Table 3 that was ion-exchanged using a $KNO_3$ salt bath to replace Na ions in the glass with larger K ions. The coating quality and thickness made from using the method described here was found to be equivalent to dip coating method. One advantage to using the coating method described herein is that coating tip, the element containing the slot and coating pad, can be modified to enable coating various edge profiles and glass thicknesses with high material utilization compare to other processes.

FIGS. 4a and 4b show 0.7 mm and 1.1 mm glass articles whose edges have been coated using the coating material described in Table 1. The coating material was UV cured directly after it was coated onto the glass edge(s). Similar results were obtained using the coating material described in Table 2.

Figure 5A:
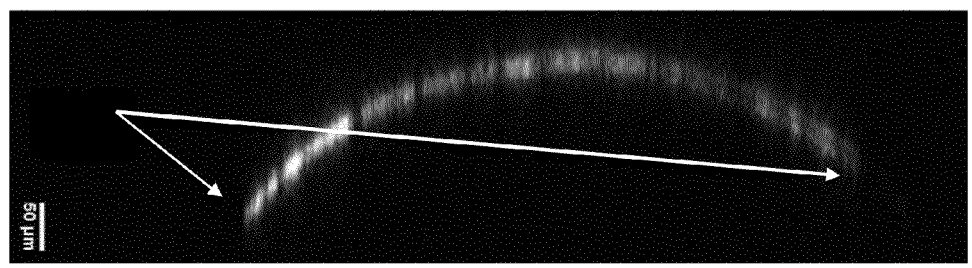
FIG. 5a is con-focal microscope image show a glass article having a symmetrical bull nose edge profile, the coating being a 40-50 µm UV cured polymer coating at the tip of the bull nose.
Figure 5B:
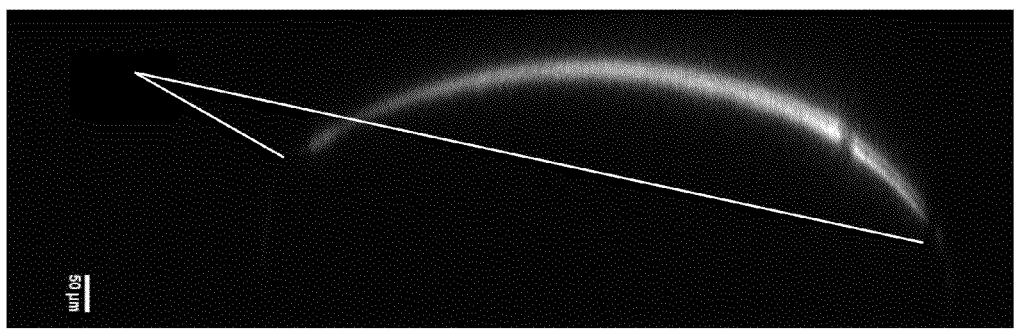
FIG. 5b is con-focal microscope image show a glass article having a non-symmetrical edge profile.

FIGS. 5a and 5b are photographs taken using a con-focal microscope. In FIG. 5a, numeral 30 shown beveled/non-beveled regions of a bull nosed article's edge, the edge having a symmetrical profile. In FIG. 5b, numeral 33 shows the beveled/non-beveled regions of a bull nosed article's edge, the edge having a non-symmetrical profile, FIG. 6a is a photograph of a bull nosed glass article edge having a single coating layer of the coating material of Table 1. FIG. 6b is a photograph of a bull nosed glass article have four coating layers. The polymer coating material was applied to the edge and cured directly after application. This cycle was carried out once for FIG. 6a and four time for FIG. 6b. The coating in FIG. 6a is 45 μm thick. The coating in FIG. 6b is 134 μm thick.

Using the method and devices described herein, the advantages of that can be realized are:

(1) The wrap-around coating method allows one to achieve a uniform and smooth layer all around the glass edge to provide the impact resistance.
(2) The wrap-around coating method can be applied to various glass edge profiles such as flat, curved, bull nosed, chamfered etc.
(3) The wrap-around method can be used to apply a coating to the edges on various glass thicknesses, for example without limitation, glass articles having thicknesses of 0.6 mm, 0.7 mm, 1.1 mm.
(4) The wrap-around coating method lends itself to multiple application of the coating material to glass edges to obtain a desired coating thickness
(5) The wrap-around coating method can used with coating materials having a wide viscosity range, for example, coating materials having a viscosity in the range of 300 cps to 10000 cps. In one embodiment the viscosity was in the range of 500 cps to 4000 cps.
(6) Using the method and device(s) described herein, the coating can be applied in such a way that it will either be applied only to the glass edge(s) only or extended to cover the both the shaped edge and one or both of the glass faces for a selected distance from the edge.
(7) The coating method and device(s) described herein can be installed adjacent to a UV curing unit so that coating can be cured within seconds after it applied to the glass' edge(s).
(8) The coating method and device(s) described herein can be modified to that a plurality of glass articles can be simultaneously coated on a single production line by using a tip element having multiple slots and coating pads. Further, different slots can have different shaped pads so that glass articles with different shaped edges can be processed simultaneously.
(9) The coating method and device(s) described herein can be used with different types of UV curable polymeric materials. The polymeric materials can contain nanoparticles or can be nanoparticle free.
(10) The wrap-around method can be used for both symmetrical and non-symmetrical edge profiles; for example without limitation, a bull nose profile in which the bevel on each side of bull nose tip has a different bevel length.
(11) Coating material drifting on the coated sides is avoided.
(12) Coating material utilization is very high; there is no waste of the coating materials relative to dip or spray coating methods.

This disclosure is directed to a method for coating the edge of glass articles, the method comprising:
providing a glass article having at least one shaped edge,
providing a coating pad having a coating surface shaped to conform to the shaped edge of the glass article, the pad having a network of interconnected openings therethrough;
supplying a selected UV curable coating material to the coating pad;
swiping the at least one shaped edge across the coating pad surface that conform to the shape of the glass edge to transfer a selected thickness of the coating material from the coating pad to the at least one glass edge;

providing a source of UV radiation for curing the UV curable coating material;

curing the UV curable coating material on the shaped glass edge; and repeating the swiping and curing steps as necessary to provide a glass article having a selected thickness of cured coating material thereon. The coating material transferred per swipe to shaped glass edge is in the range of 15 µm to 25 µm. The interconnected openings in the pad have a diameter in the range of 0.01 µm to 1000 µm. The UV curable coating material is selected from the group consisting of urethane (meth)acrylate oligomer(s) containing nano-size inorganic particles and epoxy resins containing nano-size inorganic particles, the particle size being in the range of 1 nm to 100 nm. The provided glass can be an ion-exchanged glass or a glass that has not been ion-exchanged (non-ion-exchanged glass).

The disclosure is further directed to an apparatus for coating the edge of class articles having shaped edges, the apparatus comprising:

a vessel containing a UV curable coating material;

a coating pad having interconnected opening through the pad an a coating surface shaped to conform to the shaped edge of the glass article;

an element containing the coating pad; and a means for transferring the coating material from the vessel to the element containing the coating pad and the coating pad therein. The means for transferring the coating material from the vessel to the pad is a pump connected to the vessel and the element containing the coating pad.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

We claim:

1. A method for coating the edge of glass articles, the method comprising:

inserting a shaped edge of a glass article into a slot in a coating apparatus, wherein the coating apparatus comprises:

a vessel containing a UV curable coating material;

an element connected to the vessel having the slot, wherein the slot is shaped to receive an edge of the glass article; and a coating pad having a coating surface shaped to conform to the shaped edge of the glass article, the pad having a network of interconnected openings therethrough, wherein the coating pad extends from the vessel and into the element so that the coating surface forms a bottom surface of the slot;

supplying the UV curable coating material to the coating pad;

contacting the shaped edge with the coating pad surface to transfer a selected thickness of the coating material from the coating pad to the shaped edge; and curing the UV curable coating material on the shaped glass edge.

2. The method according to claim 1, wherein the glass article is selected from the group consisting of ion-exchanged glass and non-ion-exchanged glass.

3. The method according to claim 1, wherein the thickness of the coating material transferred to the shaped edge is in the range of 15 µm to 25 µm.

4. The method according to claim 1, wherein interconnected openings in the pad have a diameter in the range of 0.01 µm to 1000 µm.

5. The method according to claim 1, wherein the UV curable coating material is selected from the group consisting of urethane (meth)acrylate oligomer(s) containing nano-size inorganic particles and epoxy resins containing nano-size inorganic particles, the particle size being in the range of 1 nm to 100 nm.

6. The method according to claim 5, wherein the nanoparticles have a size in the range of 5 nm to 50 nm.

7. The method according to claim 5, wherein the nanoparticles have a size in the range of 10 nm to 40 nm.

8. The method according to claim 5, wherein the nano-size inorganic particles are selected from the group consisting of silica, carbon and the oxides of iron, aluminum, titanium, tin, zirconium, indium, antimony and cerium.

9. The method according to claim 1, further comprising repeating the contacting and curing steps to increase the thickness of the coating material on the shaped edge.

10. The method according to claim 1, wherein contacting comprises swiping the shaped edge through the slot across the coating pad surface.

11. The method according to claim 1, wherein the shaped edge is chamfered.

12. The method according to claim 1, wherein the shaped edge is bull nosed.

13. The method according to claim 1, wherein the shaped edge is flat.

* * * * *